(12) United States Patent
Kang et al.

(10) Patent No.: US 9,781,597 B2
(45) Date of Patent: Oct. 3, 2017

(54) ELECTRONIC DEVICE AND NETWORK CONNECTION METHOD OF ELECTRONIC DEVICE

(71) Applicant: Samsung Electronics Co., Ltd., Gyeonggi-do (KR)

(72) Inventors: Byungsung Kang, Gyeonggi-do (KR); Saerome Kim, Gyeonggi-do (KR); Soonho Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 76 days.

(21) Appl. No.: 14/737,079

(22) Filed: Jun. 11, 2015

(65) Prior Publication Data

US 2015/0365376 A1 Dec. 17, 2015

(30) Foreign Application Priority Data

Jun. 11, 2014 (KR) ........................ 10-2014-0070588

(51) Int. Cl.
| | | |
|---|---|---|
| H04W 8/26 | (2009.01) | |
| H04W 88/16 | (2009.01) | |
| H04L 29/12 | (2006.01) | |
| H04W 80/04 | (2009.01) | |

(52) U.S. Cl.
CPC ............ *H04W 8/26* (2013.01); *H04L 61/103* (2013.01); *H04L 61/2015* (2013.01); *H04W 80/04* (2013.01); *H04W 88/16* (2013.01)

(58) Field of Classification Search
None
See application file for complete search history.

(56) References Cited

U.S. PATENT DOCUMENTS

| 6,904,025 | B1 * | 6/2005 | Madour | ............ | H04W 36/0011 |
| | | | | | 370/310.2 |
| 9,084,108 | B2 * | 7/2015 | Zhu | ...................... | H04L 63/0272 |
| 9,119,121 | B2 * | 8/2015 | Cohen-Arazi | .... | H04W 36/0077 |
| 9,258,209 | B2 * | 2/2016 | Janardhanan | ........... | H04L 45/04 |
| 2007/0192506 | A1 * | 8/2007 | Gupta | ................... | H04W 40/36 |
| | | | | | 709/238 |

(Continued)

FOREIGN PATENT DOCUMENTS

WO    WO 2014/183088    11/2014

OTHER PUBLICATIONS

Bernard Aboba, "IPv4 Network Attachment Detection", Network Working Group, Internet-Draft, Jun. 12, 2003, 11 pages.

(Continued)

*Primary Examiner* — Hong Cho
(74) *Attorney, Agent, or Firm* — The Farrell Law Firm, P.C.

(57) ABSTRACT

A method and an electronic device are provided for providing a network connection. Gateway address information of a first network is received from the first network. The gateway address information is configured as gateway address information of the electronic device. It is determined whether the configured gateway address information remains valid when the network connection of the electronic device is switched from the first network to a second network. It is determined whether to update the configured gateway address information based on whether the configured gateway address information remains valid.

18 Claims, 8 Drawing Sheets

(56) References Cited

U.S. PATENT DOCUMENTS

2009/0213792 A1* 8/2009 Lee .................. H04L 29/12264
                                                      370/328
2009/0325573 A1   12/2009 Meyer et al.
2010/0098026 A1*  4/2010 Wada ................ H04L 29/12009
                                                      370/331

OTHER PUBLICATIONS

B. Aboba et al., "Detecting Network Attachment in IPv4 (DNAv4)", Network Working Group, Standards Track, Mar. 2006, 15 pages.
European Search Report dated Nov. 10, 2015 issued in counterpart appln. No. 15171055.5-1505, 8 pages.

* cited by examiner

ELECTRONIC DEVICE AND NETWORK CONNECTION METHOD OF ELECTRONIC DEVICE

PRIORITY

This application claims priority under 35 U.S.C. §119(a) to Korean Patent Application No. 10-2014-0070588, filed on Jun. 11, 2014, the content of which is incorporated herein by reference.

BACKGROUND OF THE INVENTION

1. Field of the Invention

The present invention relates generally to an electronic device and a network connection method of the electronic device, and more particularly, to a network connection method in which gateway address information is updated based on a determined validity of the gateway address information.

2. Description of the Prior Art

Due to the development of wireless communication technology and the dissemination of wireless relay apparatuses, electronic device users are able to perform wireless data communication at high speeds in various places.

A user can exchange desired data using Wi-Fi, 3rd generation communication, and 4th generation communication, and the wireless data communication can be performed through a wireless relay apparatus, such as, for example, an Access Point (AP).

When wireless data communication is performed, and an electronic device moves from a specific area to another area, communication that was previously performed with a first AP in the specific area can be performed with a second AP in the other area.

When roaming to the second AP while data communication is performed with the first AP, and gateway address information assigned from the first AP is used without updating the information, the electronic device cannot perform data communication with the second AP after the roaming if the gateway address information of the second AP is different from gateway address information of the first AP.

Further, when the gateway address information assigned from the first AP is always updated, and the gateway address information assigned from the second AP is identical to the gateway address information assigned from the first AP, a load can be generated in radio resources and can also be generated in a server transmitting gateway address information.

SUMMARY OF THE INVENTION

The present invention has been made to address at least the above problems and/or disadvantages and to provide at least the advantages described below. Accordingly, an aspect of the present invention provides a network connection method and electronic device for updating gateway address information based on a determined validity of the gateway address information.

According to an aspect of the present invention, a method is provided for providing a network connection of an electronic device. Gateway address information of a first network is received from the first network. The gateway address information is configured as gateway address information of the electronic device. It is determined whether the configured gateway address information remains valid when the network connection of the electronic device is switched from the first network to a second network. It is determined whether to update the configured gateway address information based on whether the configured gateway address information remains valid.

According to another aspect of the present invention, an electronic device is provided that includes a communication module that is connected to at least one of a first network and a second network. The electronic device also includes a processor that configures gateway address information of the first network, which is received from the first network, as gateway address information of the electronic device, determines whether the configured gateway address information remains valid when a network connection of the electronic device is switched from the first network to the second network, and determines whether to updated the configured gateway address information based on whether the configured gateway address information remains valid.

According to an additional aspect of the present invention, a computer readable recoding medium is provided, which records a program for executing operations, which include: receiving gateway address information of a first network from the first network; configuring the gateway address information as gateway address information of an electronic device; determining whether the configured gateway address information remains valid when a network connection of the electronic device is switched from the first network to a second network; and determining whether to update the configured gateway address information based on whether configured gateway address information remains valid.

BRIEF DESCRIPTION OF THE DRAWINGS

The above and other aspects, features, and advantages of the present invention will be more apparent from the following detailed descriptions when taken in conjunction with the accompanying drawings, in which.

DETAILED DESCRIPTION OF EMBODIMENTS OF THE PRESENT INVENTION

Figure 1:
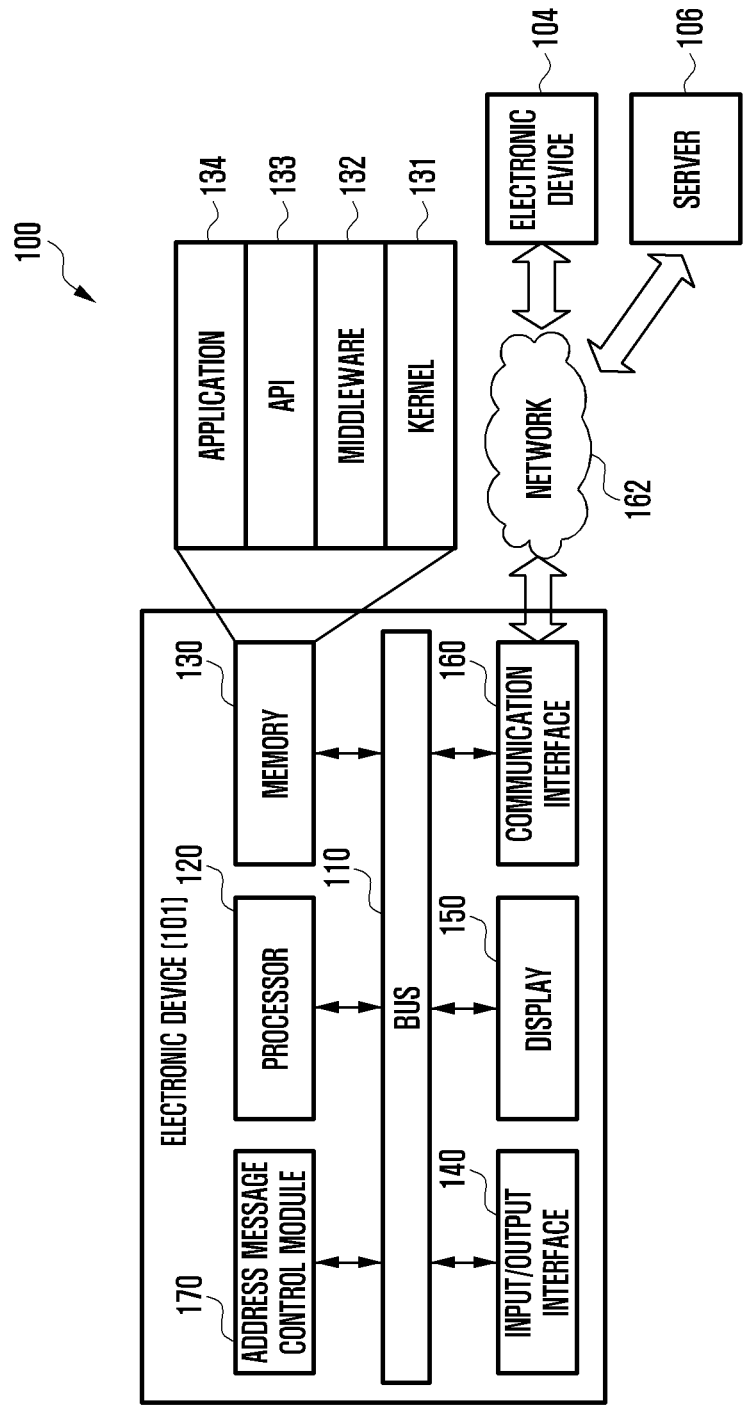
FIG. 1 is a diagram illustrating a network environment including an electronic device, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to the meanings found in an ordinary dictionary, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

As used herein, the singular forms "a", "an", and "the" are intended to include the plural forms, including "at least one", unless the content clearly indicates otherwise. The term "or" means "and/or". As used herein, the term "and/or" includes any and all combinations of one or more of the associated listed items. It will be further understood that the terms "comprises" and/or "comprising", or "includes" and/ or "including" when used herein, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first", "second", "third", etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, a first element, component, region, layer, or section could also be referred to as a second element, component, region, layer or section without departing from the teachings herein.

Herein, an electronic device may be a device that involves a communication function. For example, an electronic device may be embodied as a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., a Head-Mounted Device (HMD) such as electronic glasses, electronic clothes, an electronic bracelet, an electronic necklace, an electronic appcessory, or a smart watch).

According to an embodiment of the present invention, an electronic device may be a smart home appliance that involves a communication function. For example, an electronic device may be a Television (TV), a Digital Versatile Disc (DVD) player, audio equipment, a refrigerator, an air conditioner, a vacuum cleaner, an oven, a microwave, a washing machine, an air cleaner, a set-top box, a TV box, a game console, an electronic dictionary, an electronic key, a camcorder, or an electronic picture frame.

According to an embodiment of the present invention, an electronic device may be a medical device (e.g., Magnetic Resonance Angiography (MRA), Magnetic Resonance Imaging (MRI), Computed Tomography (CT), ultrasonography, etc.), a navigation device, a Global Positioning System (GPS) receiver, an Event Data Recorder (EDR), an Flight Data Recorder (FDR), a car infotainment device, electronic equipment for ship (e.g., a marine navigation system, a gyrocompass, etc.), avionics, security equipment, or an industrial or home robot.

According to an embodiment of the present invention, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure.

FIG. 1 is a block diagram illustrating a network environment, according to an embodiment of the present invention. A network environment 100 includes an electronic device 101. The electronic device 101 includes, but is not limited to, a bus 110, a processor 120, a memory 130, an input/output interface 140, a display 150, a communication interface 160, and an address message control module 170.

The bus 110 is a circuit designed for connecting the above-described elements and communicating data (e.g., a control message) between such elements.

The processor 120 may receive commands from the other elements (e.g., the memory 130, the input/output interface 140, the display 150, the communication interface 160, or the address message control module 170, etc.) through the bus 110, interpret the received commands, and perform computations or data processing based on the interpreted commands.

The memory 130 may store therein commands or data received from or created at the processor 120 or other elements (e.g., the input/output interface 140, the display 150, the communication interface 160, or the address message control module 170, etc.). The memory 130 includes programming modules such as, for example, a kernel 131, a middleware 132, an Application Programming Interface (API) 133, and an application 134. Each of the programming modules may be composed of software, firmware, hardware, and any combination thereof.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 101.

The middleware 132 may perform intermediation by which the API 133 or the application 134 communicates with the kernel 131 to transmit or receive data. Additionally, in connection with task requests received from the application 134, the middleware 132 may perform a control (e.g., scheduling or load balancing) for the task request by using technique such as assigning the priority for using a system resource of the electronic device 101 (e.g., the bus 110, the processor 120, or the memory 130, etc.) to at least one application 134.

The API 133, which is an interface for allowing the application 134 to control a function provided by the kernel 131 or the middleware 132*m* may include, for example, at least one interface or function (e.g., a command) for a file control, a window control, an image processing, a text control, and the like.

According to an embodiment of the present invention, the application 134 may include a Short Message Service/ Multimedia Messaging Service (SMS/MMS) application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 may be an application associated with an exchange of information between the electronic device 101 and any external electronic device (e.g., an external electronic device 104). This type application may include a notification relay application for delivering specific information to the external electronic device 104, or a device management application for managing the external electronic device 104.

For example, the notification relay application may include a function to deliver notification information created at any other application of the electronic device 101 (e.g., the SMS/MMS application, the email application, the health care application, or the environment information application, etc.) to the external electronic device 104. Additionally or alternatively, the notification relay application may receive notification information from the external electronic device 104 and offer it to a user. The device management application may manage (e.g., install, remove or update) a certain function (a turn-on/turn-off of an external electronic device (or some components thereof), or an adjustment of brightness (or resolution) of a display) of the electronic device 104 communicating with the electronic device 101, a certain application operating at the external electronic device 104, or a certain service (e.g., a call service or a message service) offered by the external electronic device 104.

According to an embodiment of the present invention, the application 134 may include a specific application specified depending on attributes (e.g., a type) of the electronic device 104. For example, when the external electronic device 104 is an MP3 player, the application 134 may include a specific application associated with playing music. Similarly, when the external electronic device 104 is a portable medical device, the application 134 may include a specific application associated with health care. In an embodiment of the present invention, the application 134 may include at least one of an application assigned to the electronic device 101 or an application received from a server 106 or the external electronic device 104.

The input/output interface 140 may deliver commands or data, entered by a user through an input/output unit (e.g., a sensor, a keyboard, or a touch screen), to the processor 120, the memory 130, the communication interface 160, or the address message control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the address message control module 170 via the bus 110. For example, the input/output interface 140 may output voice data, processed through the processor 120, to a user through the speaker.

The display 150 may display thereon various kinds of information (e.g., multimedia data, text data, etc.) to a user.

The communication interface 160 may perform a communication between the electronic device 101 and any external electronic device (e.g., the external electronic device 104 or the server 106). For example, the communication interface 160 may communicate with any external device by being connected with a network 162 through a wired or wireless communication. A wireless communication may include, but is not limited to, at least one of Wireless Fidelity (WiFi), Bluetooth (BT), Near Field Communication (NFC), Global Positioning System (GPS), or a cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communication (GSM), etc.). A wired communication may include, but is not limited to, at least one of Universal Serial Bus (USB), High Definition Multimedia Interface (HDMI), Recommended Standard 232 (RS-232), or Plain Old Telephone Service (POTS).

According to an embodiment of the present invention, the network 162 may be a communication network, which may include at least one of a computer network, an internet, an internet of things, or a telephone network. According to an embodiment of the present invention, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

The address message control module 170 may process at least part of the information obtained from the other elements (e.g., the processor 120, the memory 130, the input/output interface 140, or the communication interface 160, etc.) and then offer it to a user in various ways. For example, the address message control module 170 may recognize information about access components equipped in the electronic device 101, store such information in the memory 130, and execute the application 134 based on such information. The address message control module 170 is described in greater detail below with reference to FIG. 2

The address message control module 170 may perform a function of searching a physical address (a Media Access Control (MAC) address of the destination node) of a destination node corresponding to a logical address (an IP address of the destination node) of the destination node using an Address Resolution Protocol (ARP) under a control of the processor 120. Specifically, the address message control module 170 may transmit an address identification message, e.g., an ARP request message to the external electronic device 104 through the network 162 under the control of the processor 120. The address message control module 170 may receive the address response message, e.g., an ARP reply message from the external electronic device 104 through the network 162 under the control of the processor 120.

Figure 2:
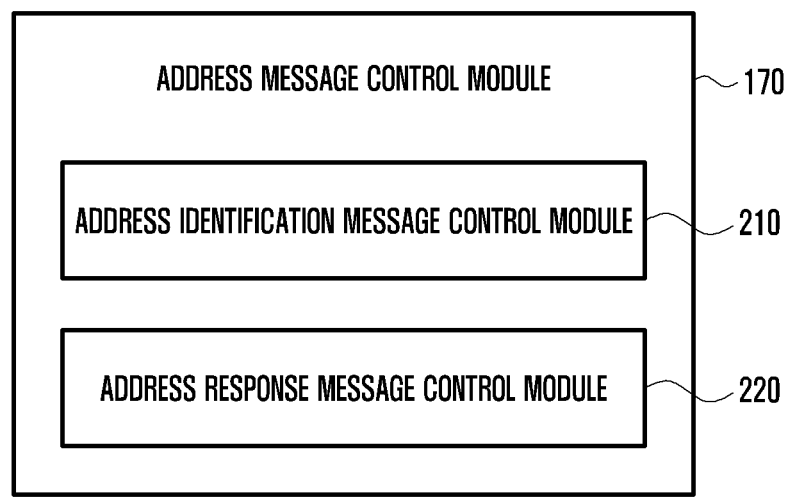
FIG. 2 is a block diagram illustrating an address message control module of an electronic device, according to an embodiment of the present invention.

FIG. 2 is a block diagram illustrating the address message control module of the electronic device, according to an embodiment of the present invention. Referring to FIG. 2, the address message control module 170 includes an address identification message control module 210 and an address response message control module 220.

When the electronic device 101 roams from a first network to a second network, the address identification message control module 210 broadcasts an address identification message to the second network in order to identify whether gateway address information of the first network is valid in the second network. The address identification message may include an ARP request message. The address identification message may include IP address information of a predetermined gateway in the electronic device 101. The address identification message control module 210 may broadcast the address identification message to a network connected to the electronic device 101 in order to find an external electronic device (e.g., the electronic device 104) by the electronic device 101. The address identification message may include IP address information of the external electronic device 104 that the electronic device 101 desires to find.

The address response message control module 220 receives an address response message from a gateway of the second network in response to the address identification message. The address response message may include an ARP reply message. The address response message may include MAC address information of the gateway corresponding to the IP address information of the gateway. The address response message control module 220 may perform wireless data communication using the MAC address information of the gateway included in the received address response message. The address, response message control module 220 may receive an address response message from the external electronic device 104 in response to an address identification message transmitted to find the external electronic device 104 by the electronic device 101. The address response message may include the MAC address information of the external electronic device 104 corresponding to the IP address information of the external electronic device 104.

Figure 3:
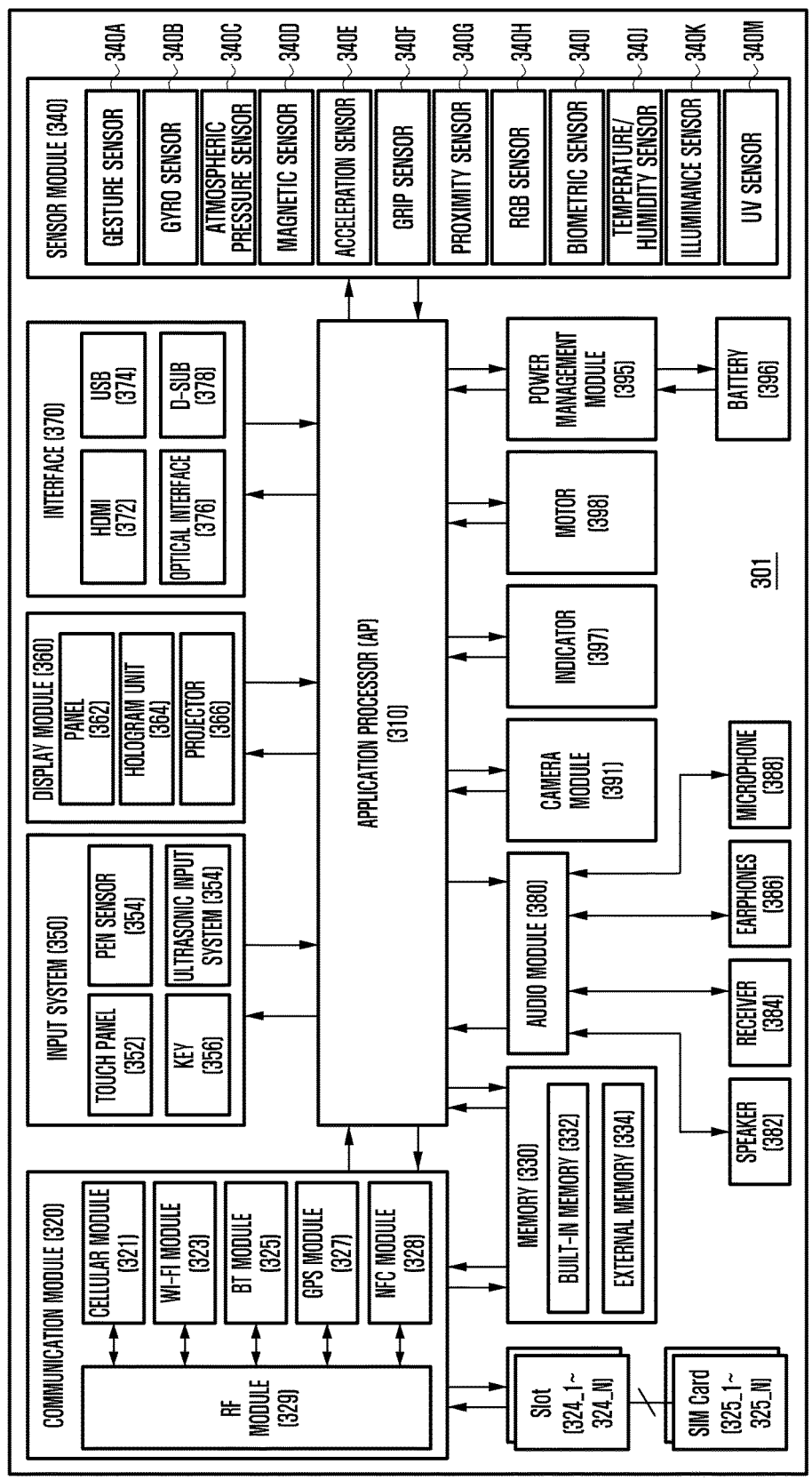
FIG. 3 is a block diagram illustrating an electronic device, according to an embodiment of the present invention.

FIG. 3 is a block diagram illustrating an electronic device, according to an embodiment of the present invention. An electronic device 301 may form, for example, the whole or part of the electronic device 101 shown in FIG. 1. Referring to FIG. 3, the electronic device 301 includes at least one Application Processor (AP) 310, a communication module 320, a Subscriber Identification Module (SIM) card 324, a memory 330, a sensor module 340, an input system 350, a display module 360, an interface 370, an audio module 380, a camera module 391, a power management module 395, a battery 396, an indicator 397, and a motor 398.

The AP 310 may drive an operating system or applications, control a plurality of hardware or software components connected thereto, and also perform processing and operation for various data including multimedia data. The AP 310 may be formed as a System-on-Chip (SoC), for example. According to an embodiment of the present invention, the AP 310 may further include a Graphic Processing Unit (GPU).

The communication module 320 (e.g., the communication interface 160) may perform data communication with any other electronic device (e.g., the external electronic device 104 or the server 106) connected to the electronic device 301 (e.g., the electronic device 101) through the network. According to an embodiment of the present invention, the communication module 320 includes therein a cellular module 321, a WiFi module 323, a BT module 325, a GPS module 327, an NFC module 328, and a Radio Frequency (RF) module 329.

The cellular module 321 may offer a voice call, a video call, a message service, an internet service, or the like through a communication network (e.g., LTE, LTE-A, CDMA, WCDMA, UMTS, WiBro, or GSM, etc.). Additionally, the cellular module 321 may perform identification and authentication of the electronic device in the communication network, using the SIM card 324. According to an embodiment of the present invention, the cellular module 321 may perform at least part of the functions the AP 310 can provide. For example, the cellular module 321 may perform at least part of a multimedia control function.

According to an embodiment of the present invention, the cellular module 321 may include a Communication Processor (CP). Additionally, the cellular module 321 may be formed as a SoC, for example. Although some elements, such as the cellular module 321 (e.g., the CP), the memory 330, or the power management module 395, are shown as separate elements from the AP 310 in FIG. 3, the AP 310 may be formed to have at least part (e.g., the cellular module 321) of the above elements in an embodiment of the present invention.

According to an embodiment of the present invention, the AP 310 or the cellular module 321 (e.g., the CP) may load commands or data, received from a nonvolatile memory connected thereto or from at least one of the other elements, into a volatile memory to process them. Additionally, the AP 310 or the cellular module 321 may store data, received from or created at one or more of the other elements, in the nonvolatile memory.

Each of the WiFi module 323, the BT module 325, the GPS module 327 and the NFC module 328 may include a processor for processing data transmitted or received therethrough. Although FIG. 3 shows the cellular module 321, the WiFi module 323, the BT module 325, the GPS module 327, and the NFC module 328 as different blocks, at least part of them may be contained in a single Integrated Circuit (IC) chip or a single IC package in an embodiment of the present invention. For example, at least part (e.g., the CP corresponding to the cellular module 321 and a WiFi processor corresponding to the WiFi module 323) of respective processors corresponding to the cellular module 321, the WiFi module 323, the BT module 325, the GPS module 327, and the NFC module 328 may be formed as a single SoC.

The RF module 329 may transmit and receive data, e.g., RF signals or any other electric signals. The RF module 329 may include a transceiver, a Power Amp Module (PAM), a frequency filter, a Low Noise Amplifier (LNA), or the like. Also, the RF module 329 may include any component, e.g., a wire or a conductor, for transmission of electromagnetic waves in a free air space. Although FIG. 3 shows that the cellular module 321, the WiFi module 323, the BT module 325, the GPS module 327, and the NFC module 328 share the RF module 329, at least one of them may perform transmission and reception of RF signals through a separate RF module in an embodiment of the present invention.

The SIM card 325_1 to 325_N may be a specific card formed of SIM and may be inserted into a slot 324_1 to 324_N formed at a certain place of the electronic device. The SIM card 325_1 to 325_N may contain therein an Integrated Circuit Card IDentifier (ICCID) or an International Mobile Subscriber Identity (IMSI).

The memory 330 (e.g., the memory 130) includes an internal memory 332 and/or an external memory 334. The internal memory 332 may include, for example, at least one of a volatile memory (e.g., Dynamic RAM (DRAM), Static RAM (SRAM), Synchronous DRAM (SDRAM), etc.) or a nonvolatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, NOR flash memory, etc.).

According to an embodiment of the present invention, the internal memory 332 may have the form of a Solid State Drive (SSD). The external memory 334 may include a flash drive, e.g., Compact Flash (CF), Secure Digital (SD), Micro-SD, Mini-SD, eXtreme Digital (xD), memory stick, or the like. The external memory 334 may be functionally connected to the electronic device 301 through various interfaces. According to an embodiment of the present invention, the electronic device 301 may further include a storage device or medium, such as a hard drive.

The sensor module 340 may measure physical quantity or sense an operating status of the electronic device 301, and then convert measured or sensed information into electric signals. The sensor module 340 includes, for example, at least one of a gesture sensor 340A, a gyro sensor 340B, an atmospheric sensor 340C, a magnetic sensor 340D, an acceleration sensor 340E, a grip sensor 340F, a proximity sensor 340G, a color sensor 340H (e.g., Red, Green, Blue (RGB) sensor), a biometric sensor 340I, a temperature-humidity sensor 340J, an illumination sensor 340K, and an ultraviolet (UV) sensor 340M. Additionally or alternatively, the sensor module 340 may include, e.g., an E-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 340 may include a control circuit for controlling one or more sensors equipped therein.

The input system 350 includes a touch panel 352, a digital pen sensor 354, a key 356, and/or an ultrasonic input unit 358. The touch panel 352 may recognize a touch input in a manner of capacitive type, resistive type, infrared type, or ultrasonic type. Also, the touch panel 352 may further include a control circuit. In the case of a capacitive type, a physical contact or proximity may be recognized. The touch panel 352 may further include a tactile layer. In this case, the touch panel 352 may offer a tactile feedback to a user.

The digital pen sensor 354 may be formed in the same or similar manner as receiving a touch input or by using a separate recognition sheet. The key 356 may include, for example, a physical button, an optical key, or a keypad. The ultrasonic input unit 358 is a specific device capable of identifying data by sensing sound waves with a microphone 388 in the electronic device 301 through an input tool that generates ultrasonic signals, thus allowing wireless recognition. According to an embodiment of the present invention, the electronic device 301 may receive a user input from any external device (e.g., a computer or a server) connected thereto through the communication module 320.

The display module 360 (e.g., the display 150) includes a panel 362, a hologram unit 364, and/or a projector 366. The panel 362 may be, for example, Liquid Crystal Display (LCD), Active Matrix Organic Light Emitting Diode (AMOLED), or the like. The panel 362 may have a flexible, transparent or wearable form. The panel 362 may be formed of a single module with the touch panel 352. The hologram unit 364 may show a stereoscopic image in the air using interference of light. The projector 366 may project an image onto a screen, which may be located at the inside or outside of the electronic device 301. According to an embodiment of the present invention, the display 360 may further include a control circuit for controlling the panel 362, the hologram unit 364, and the projector 366.

The interface 370 includes, for example, a High-Definition Multimedia Interface (HDMI) 372, a Universal Serial Bus (USB) 374, an optical interface 376, and/or a D-sub-miniature (D-sub) 378. The interface 370 may be contained, for example, in the communication interface 160 shown in FIG. 1. Additionally or alternatively, the interface 370 may include, for example, a Mobile High-definition Link (MHL) interface, an SD card/Multi-Media Card (MMC) interface, or an Infrared Data Association (IrDA) interface.

The audio module 380 may perform a conversion between sounds and electric signals. At least part of the audio module 380 may be contained, for example, in the input/output interface 140 shown in FIG. 1. The audio module 380 may process sound information inputted or outputted through a speaker 382, a receiver 384, an earphone 386, or a microphone 388.

The camera module 391 is a device capable of obtaining still images and moving images. According to an embodiment of the present invention, the camera module 391 may include at least one image sensor (e.g., a front sensor or a rear sensor), a lens, an Image Signal Processor (ISP), or a flash (e.g., LED or xenon lamp).

The power management module 395 may manage electric power of the electronic device 301. The power management module 395 may include, for example, a Power Management Integrated Circuit (PMIC), a charger IC, or a battery or fuel gauge.

The PMIC may be formed, for example, of an IC chip or SoC. Charging may be performed in a wired or wireless manner. The charger IC may charge a battery 396 and prevent overvoltage or overcurrent from a charger. According to an embodiment of the present invention, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 396 and a voltage, current or temperature in a charging process. The battery 396 may store or create electric power therein and supply electric power to the electronic device 301. The battery 396 may be, for example, a rechargeable battery or a solar battery.

The indicator 397 may show thereon a current status (e.g., a booting status, a message status, or a recharging status) of the electronic device 301 or of its part (e.g., the AP 310). The motor 398 may convert an electric signal into a mechanical vibration. The electronic device 301 may include a specific processor (e.g., GPU) for supporting a mobile TV. This processor may process media data that comply with standards of Digital Multimedia Broadcasting (DMB), Digital Video Broadcasting (DVB), or media flow.

Each of the above-described elements of the electronic device may be formed of one or more components, and its name may be varied according to the type of the electronic device. The electronic device may be formed of at least one of the above-described elements without some elements or with additional other elements. Some of the elements may be integrated into a single entity that still performs the same functions as those of such elements before integrated.

The term "module" used in this disclosure may refer to a certain unit that includes one of hardware, software and firmware, or any combination thereof. The term "module" may be interchangeably used with the terms "unit", "logic", "logical block", "component", or "circuit", for example. A module may be the minimum unit, or part thereof, which performs one or more particular functions. The module may be formed mechanically or electronically. For example, the module may include at least one of an Application-Specific Integrated Circuit (ASIC) chip, Field-Programmable Gate Arrays (FPGAs), and a programmable-logic device, which have been known or are to be developed.

Figure 4:
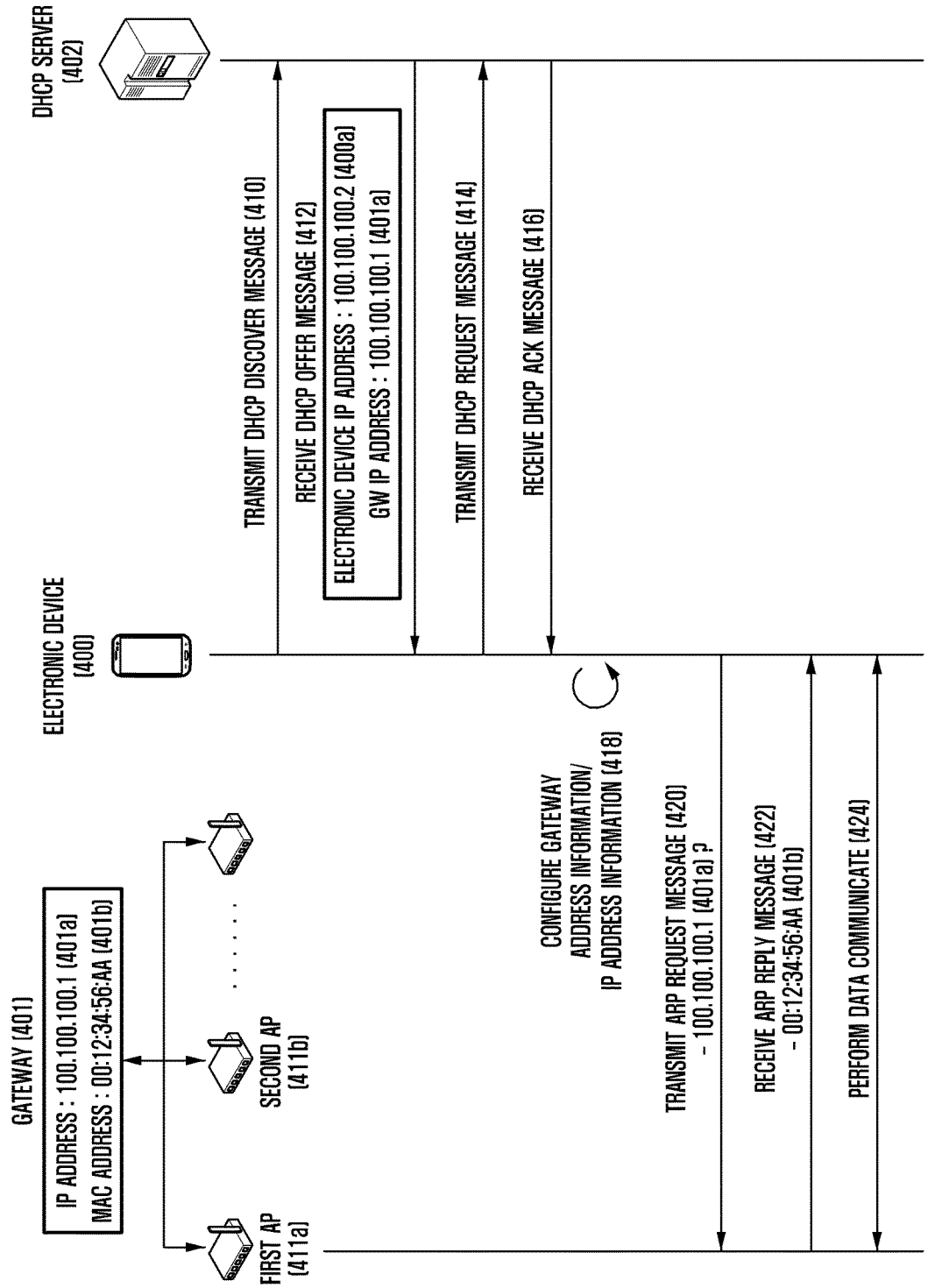
FIG. 4 is a diagram illustrating a network system in which an electronic device performs wireless data communication through an AP, according to an embodiment of the present invention.

FIG. 4 is a diagram illustrating a network system is which an electronic device performs wireless data communication through an AP, according to an embodiment of the present invention.

Referring to FIG. 4, a network system includes an electronic device 400, a gateway 401, a Dynamic Host Configuration Protocol (DHCP) server 402, and a controller. The gateway 401 or the DHCP server 402 may be included inside of the controller. The controller may perform a traffic process of wireless devices connected to the controller and allow authentication or roaming of the wireless devices to be performed. Further, the controller may balance loads of the wireless devices connected to the controller, cope with network link disorders, and take responsibility for the security of packets through a firewall. The gateway 401 or the DHCP server 402 may exist outside of the controller. The DHCP server 402 may perform a function of dynamically assigning various network information of an IP address, a subnet mask address, an IP address of a gateway, an IP address of a Domain Name System (DNS) server, and the like, to the electronic device 400 in a wired/wireless IP environment.

The electronic device 400 broadcasts a DHCP discover message to a corresponding network in order to find a DHCP server of a network, which the electronic device 400 desires to enter, in step 410. The DHCP server 402, which receives the DHCP discover message, broadcasts a DHCP offer message to the network.

According to an embodiment of the present invention, the DHCP offer message may include network information that the electronic device 400 requires, for example, IP address information (100.100.100.2) 400a of the electronic device or IP address information (100.100.100.1) 401a of the gateway.

The electronic device 400 receives the DHCP offer message from the DHCP server 402, in step 412.

The electronic device 400 transmits a DHCP request message to the DHCP server 402 in order to identify whether the DHCP offer message is valid, in step 414.

The electronic device 400 receives a DHCP Acknowledgement (ACK) message corresponding to the DHCP request message from the DHCP server 402, in step 416.

The electronic device 400 configures its own IP address 400a or IP address information 401a of the gateway 401 in the electronic device 400 based on network information 400a and 401a included in the DHCP ACK message, in step 418. When the electronic device 400 has received network information that is not valid, the processes as described above may repeatedly occur until valid network information is received.

According to an embodiment of the present invention, a server having a function similar to the DHCP server 402 may be included in the DHCP server and messages for performing a purpose similar to the DHCP message may be included in the DHCP messages.

The electronic device 400 transmits an ARP request message to the gateway 401 using the address message control module 170, in step 420. The electronic device 400 broadcasts the ARP request message to a corresponding network using the address message control module 170. Each node included in the network identifies whether the IP address information (100.100.100.1) 401a included in the ARP request message coincides with its own IP address information, includes its own MAC address in an ARP reply message when the IP address information (100.100.100.1) 401a included in the ARP request message coincides with IP address information, and then transmits its own MAC address included in the ARP reply message to the electronic device 400. The each node does not transmit any response message when the gateway IP address information 401a included in the ARP request message received from the electronic device 400 does not coincide with its own IP address information.

The gateway 401 transmits its own MAC address information (00:12:34:56:AA) 401b to the electronic device 400 when it is determined that its own IP address information (100.100.100.1) 401a is included in the ARP request message received from the electronic device 400, in step 422.

When the ARP reply message has been received, the electronic device 400 recognizes that a node having the IP address information 401a, for example, the gateway 401 exists and performs wireless data communication using the MAC address information 401b of the gateway 401 included in the ARP reply message, in step 424. When the ARP reply message has not been received, the electronic device 400 recognizes that the node having the IP address information 401a, for example, the gateway 401, does not exist in a corresponding network.

Figure 5:
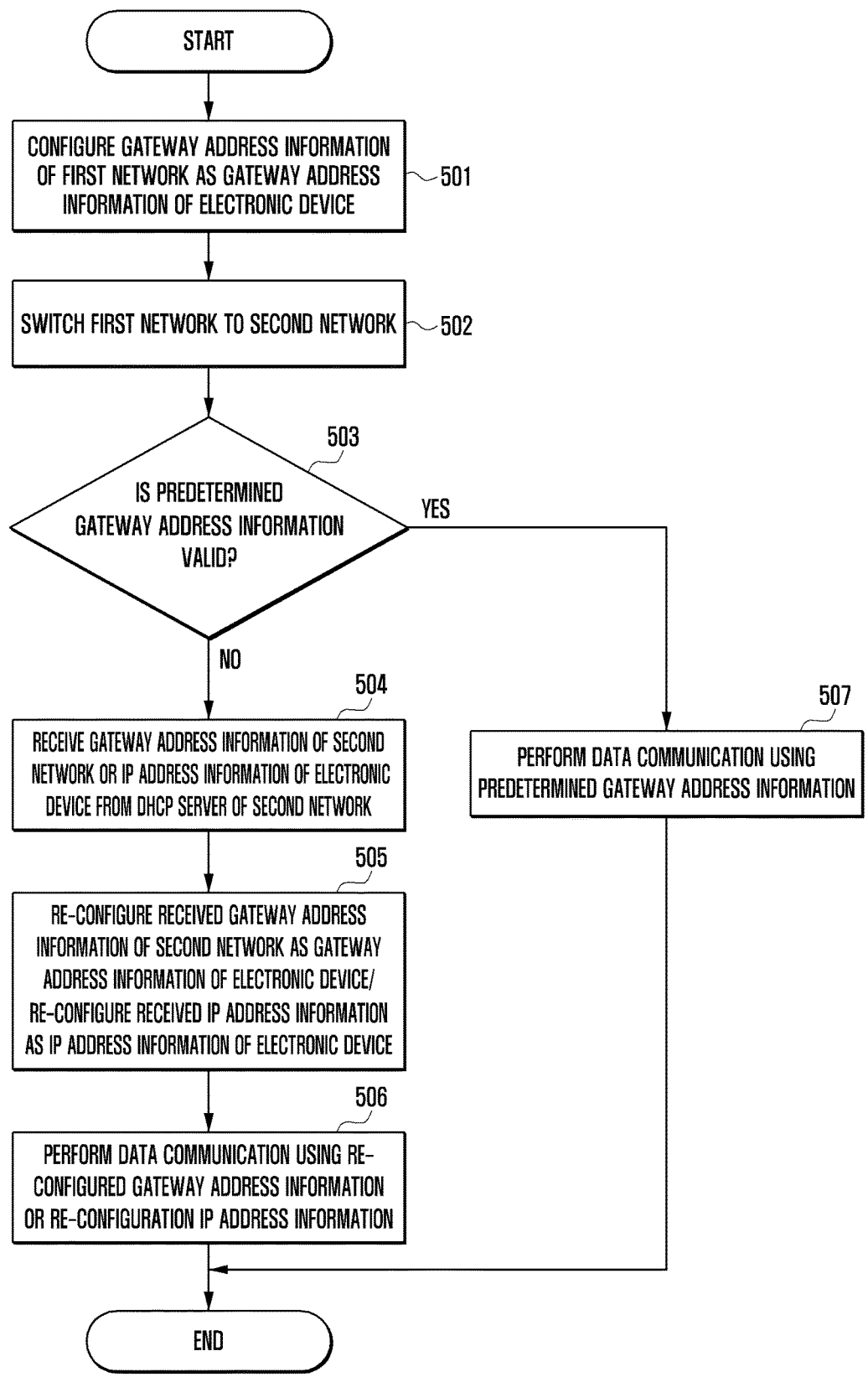
FIG. 5 is a flowchart illustrating a determination of whether gateway address information of an electronic device is updated when a network is switched, according to an embodiment of the present invention.

FIG. 5 is a flow chart illustrating a determination of whether gateway address information of an electronic device is updated when a network is switched, according to an embodiment of the present invention.

Referring to FIG. 5, an electronic device accessing a first network receives gateway address information of the first network from a DHCP server of the first network and then configures the gateway address information as gateway address information of the electronic device, in step 501. The electronic device receives the IP address information of the electronic device from the DHCP server of the first network and then configures the IP address information as own IP address information. The electronic device performs wireless data communication with the first network using the configured gateway address information of the first network or the IP address information of the electronic device. An operation of configuring the gateway address information or an operation of receiving an IP address allocated to itself may be performed through a series of processes described in FIG. 4.

According to an embodiment of the present invention, the electronic device roams from a network to another network in step 502. That is, the electronic device switches from the first network to a second network. The network switch may include a switch among a Personal Area Network (PAN), a Local Area Network (LAN), a Wide Area Network (WAN), and a Metropolitan Area Network (MAN) in accordance with division of a general network and also include various network switches such as a switch between subnet masks, a switch between wireless APs, or the like.

According to an embodiment of the present invention, the electronic device determines whether predetermined gateway address information is valid, in step 503. Referring to FIG. 4, for example, when the first network 411a has switched to a second network by configuring the gateway address information 401a of the first network 411a as the gateway address information of the electronic device 400, the electronic device 400 determines the validity of the gateway address information 401a of the predetermined first network. A method of determining the validity of the gateway address information 401a of the predetermined first network includes a method of identifying whether gateway address information of the second network is identical to the gateway address information 401a (predetermined gateway address information of the electronic device) of the first network. When the gateway address information of the first network is identical to the gateway address information of the second network, the electronic device 400 determines that the predetermined gateway address information is valid. The determination of the validity of the gateway address information is described in greater detail below with reference to FIGS. 6A to 6C.

According to an embodiment of the present invention, when predetermined gateway address information is not valid, the electronic device receives the gateway address information of the second network or the IP address information of the electronic device from the DHCP server of the second network, in step 504. The electronic device broadcasts a DHCP discover message to the second network in order to find the DHCP server of the second network. The DHCP server, which has received the DHCP discover message, broadcasts a DHCP offer message to the network. The DHCP offer message may include an IP address of the electronic device or an IP address of the gateway of the second network. The electronic device receives the DHCP offer message from the DHCP server. The electronic device transmits a DHCP request message to the DHCP server of the second network in order to determine whether the DHCP offer message is valid. The electronic device receives a DHCP ACK message corresponding to the DHCP request message from the DHCP server of the second network.

The electronic device re-configures the received gateway address information of the second network as gateway address information of the electronic device, in step 505. That is, the electronic device updates predetermined gateway address information to the gateway address information of the second network. Further, the electronic device re-configures the received IP address information of the electronic device as its own IP address information.

The electronic device performs wireless data communication using the re-configured gateway address information or the IP address information of the electronic device, in step 506. According to an embodiment of the present invention, when the predetermined gateway address information is valid, the electronic device uses the predetermined gateway address information as it is, without updating the predetermined gateway address information, in step 507. In this event, the electronic device performs steps 420 to 424, as described above, and then performs wireless data communication through the second network.

Figure 6A:
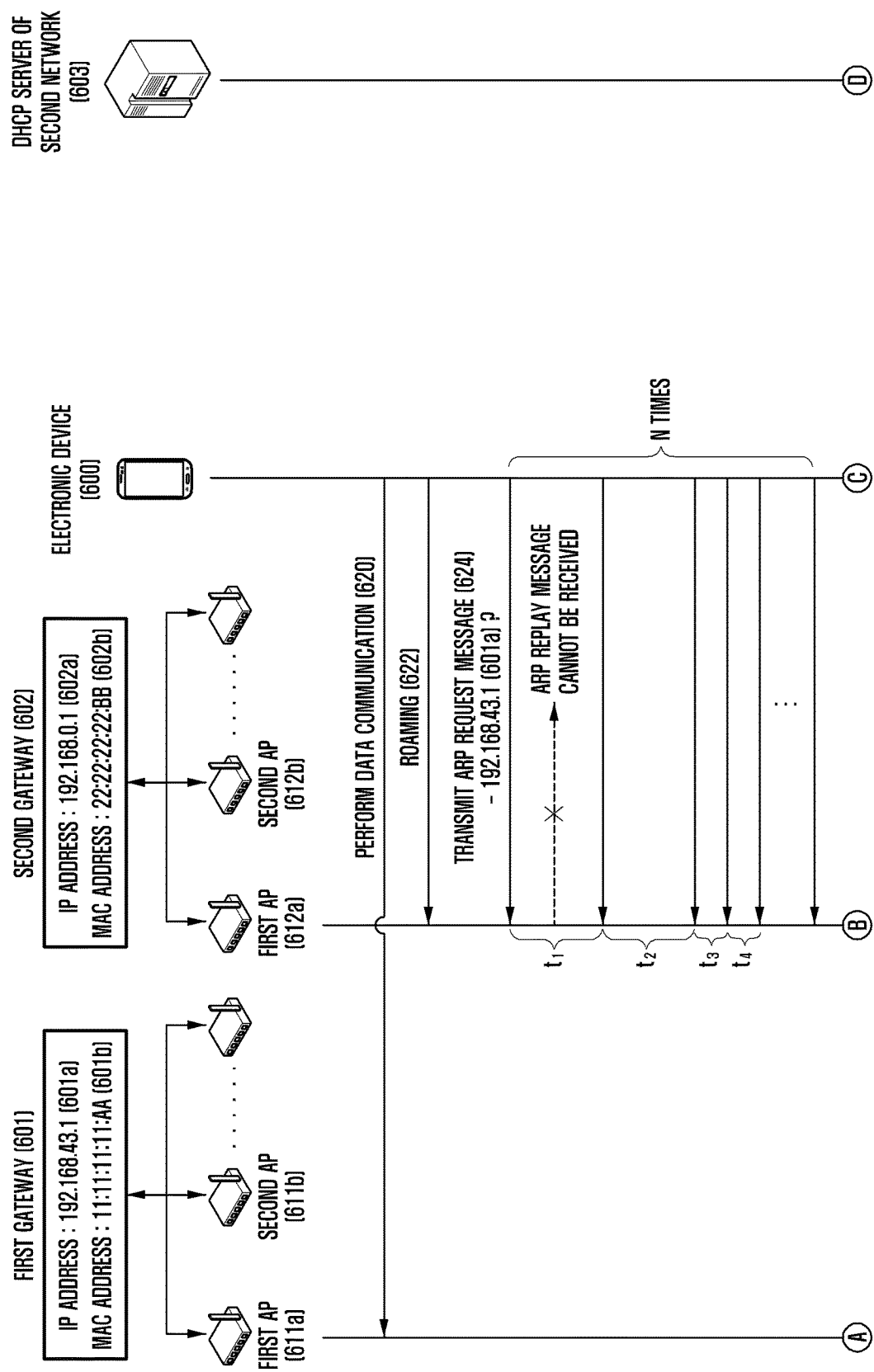
FIGS. 6A and 6B are diagrams illustrating operations of updating gateway address information of an electronic device, according to an embodiment of the present invention.
Figure 6B:
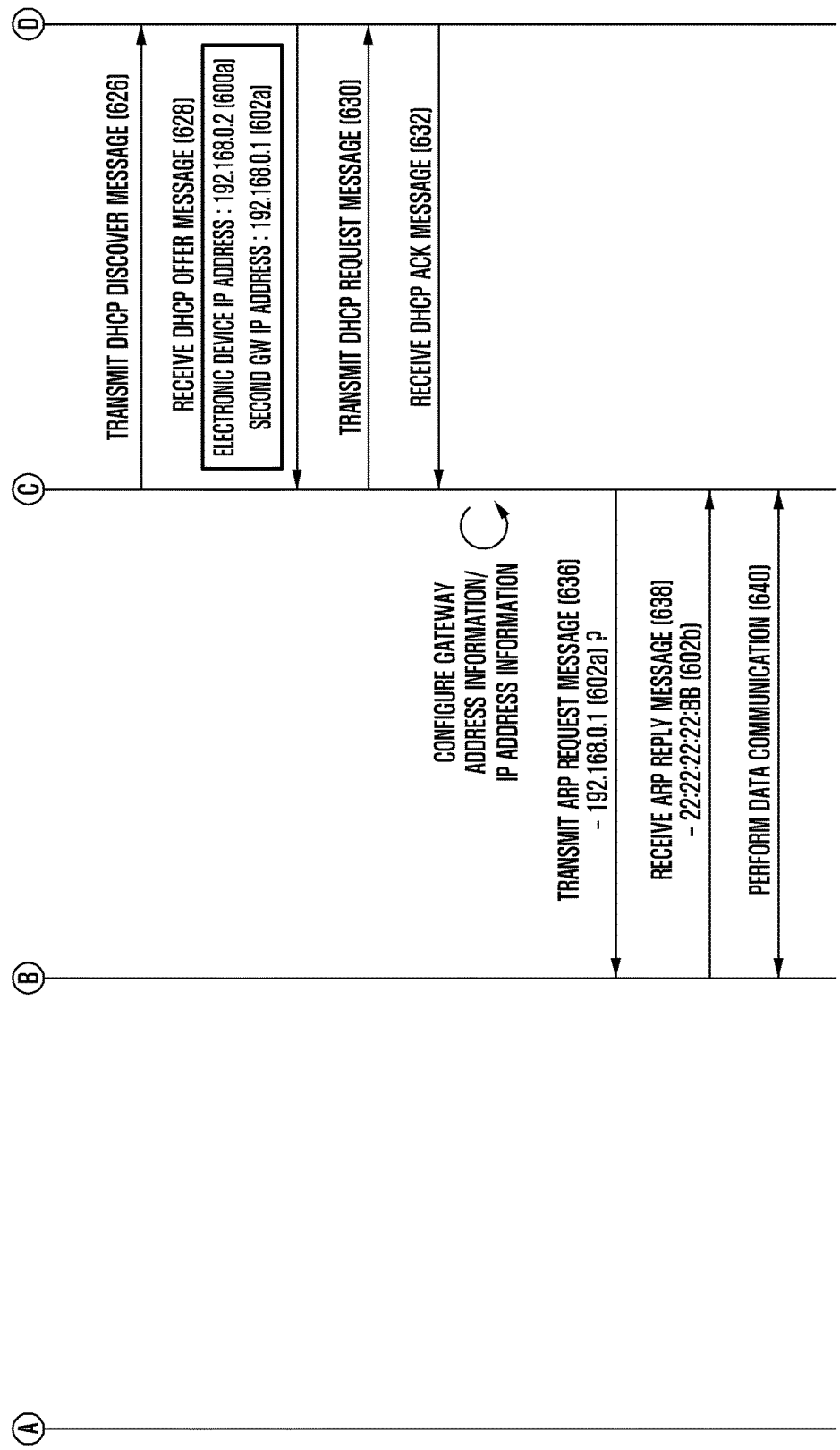

FIGS. 6A and 6B are diagrams illustrating operations of updating gateway address information of an electronic device when the predetermined gateway address information is not valid, after a network of the electronic device is switched, according to an embodiment of the present invention.

Referring to FIG. 6A, a wireless network system includes a first gateway 601, a second gateway 602, an electronic device 600, and a DHCP server 603 of a second network. The first gateway 601 or the second gateway 602 may include at least one AR The electronic device 600 performs wireless data communication through a first network. For example, according to an embodiment of the present invention, the first network corresponds to a first AP 611*a* connected to the first gateway 601.

The electronic device 600 performs each operation of FIG. 3 described above, and performs wireless data communication through the first AP 611*a* of the first gateway 601, in step 620. According to an embodiment of the present invention, the electronic device 600 performs wireless data communication through the first AP 611*a* or a second AP 611*b* of the first gateway 601. The electronic device 600 may perform wireless data communication through a first AP 612*a* or a second AP 612*b* of the second gateway 602. According to an embodiment of the present invention, the electronic device 600 performs the wireless data communication through the first AP 611*a* of the first gateway 601. Predetermined gateway address information of the electronic device 600 corresponds to IP address information (192.168.4.1) 601*a* of the first gateway 601. The electronic device 600 transmits and receives data based on MAC address information (11:11:11:11:11:AA) 601*b* corresponding to the IP address information 601*a* of the first gateway 601.

The electronic device 600 switches from the first network to the second network while performing the wireless data communication, in step 622. For example, the electronic device 600 may roam to the first AP 612*a* of the second gateway 602 while performing wireless data communication through the first AP 611*a* of the first gateway 601.

The electronic device 600 broadcasts an address identification message, which includes the predetermined gateway address information, to the second network in order to identify whether the predetermined gateway address information 601*a* is valid in the second network, in step 624. The address identification message may include an ARP request message.

According to an embodiment of the present invention, the electronic device 600 transmits the address identification message to the second network at least once. For example, the electronic device 600 may transmit the ARP request message to the second network in order to identify whether the predetermined gateway address information 601*a* is valid in the second network N times. The number of times of transmission may be randomly configured by a user of the electronic device 600, may be automatically configured as an average of the configured numbers of times of the transmission in a network before the roaming, and may be configured by various methods.

According to an embodiment of the present invention, the electronic device 600 transmits, at least once, the address identification message at a predetermined time interval or a varying time interval until an address response message in response to the address identification message is received within a designated number of times or designated time. For example, the electronic device 600 transmits the ARP request message N times for each 300 msec. The electronic device 600 transmits the ARP request message N times at a time interval, which increases by a predetermined rate, such as 100 msec-200 msec-300 msec. The electronic device 600 transmits the ARP request message N times at a time interval, which decreases by a predetermined rate such as 300 msec-200 msec-100 msec. The reason for transmitting the message at the increasing or decreasing rate is that the burden of the network is minimized because when the ARP request message has transmitted to the network, a user does not exactly know how long it takes until an ARP reply message in response to the ARP request message is received. The address response message may include the ARP reply message as a message corresponding to the address identification message. The address response message may include MAC address information of the gateway corresponding to the IP address information of the gateway.

According to an embodiment of the present invention, the electronic device 600 transmits the address identification message, for example, the ARP request message, to the gateway 602 of the second network in order to identify whether the predetermined gateway address information 601*a* is valid in the second network. If the gateway 602 of the second network has received the ARP request message when the gateway 602 of the second network is identical to the gateway 601 of the first network, an ARP reply message in response to the received ARP request message is transmitted to the electronic device 600. If the gateway 602 of the second network has received the ARP request message when the gateway 602 of the second network is not identical to the gateway 601 of the first network, an ARP reply message in response to the received ARP request message is not transmitted to the electronic device 600. For example, referring to FIG. 6A, since gateway address information (192.168.0.1) 602a of the second network is different from the gateway address information (192.168.43.1) 601a, the gateway 602 of the second network does not transmit the ARP reply message to the electronic device 600 when the ARP request message has been received from the electronic device 600.

According to an embodiment of the present invention, the electronic device 600 updates predetermined gateway address information by performing steps 626 to 634 when the address response message has not been received from the gateway 602 of the second network within the designated number of times or designated time. The electronic device 600 transmits and receives each DHCP message from the second network, for example, a DHCP server 603 of the second network in order to re-configure its own IP address information. The DHCP message received from the DHCP server 603 of the second network may include IP address information (192.168.0.2) 600a to be newly configured to the electronic device 600 or the gateway address information (192.168.0.1) 602a of the second network.

According to an embodiment of the present invention, the electronic device 600 updates the predetermined IP address information (192.168.0.2) 600a to the gateway address information (192.168.0.1) 602a of the second network, in step 634. The electronic device 600 may re-configure predetermined its own IP address information as new IP address information (192.168.0.2) 600a.

According to an embodiment of the present invention, the electronic device 600 transmits the ARP request message to the second network, in step 636. The ARP request message may include the IP address information 602a of the second gateway 602.

The electronic device 600 receives the ARP reply message from the second gateway 602 receiving the ARP request message, in step 638. The ARP reply message may include MAC address information (22:22:22:22:22:BB) 602b of the second gateway.

The electronic device 600 performs wireless data communication through the second network based on the MAC address information 602b of the second gateway 602 included in the received ARP reply message, in step 640.

Figure 6C:
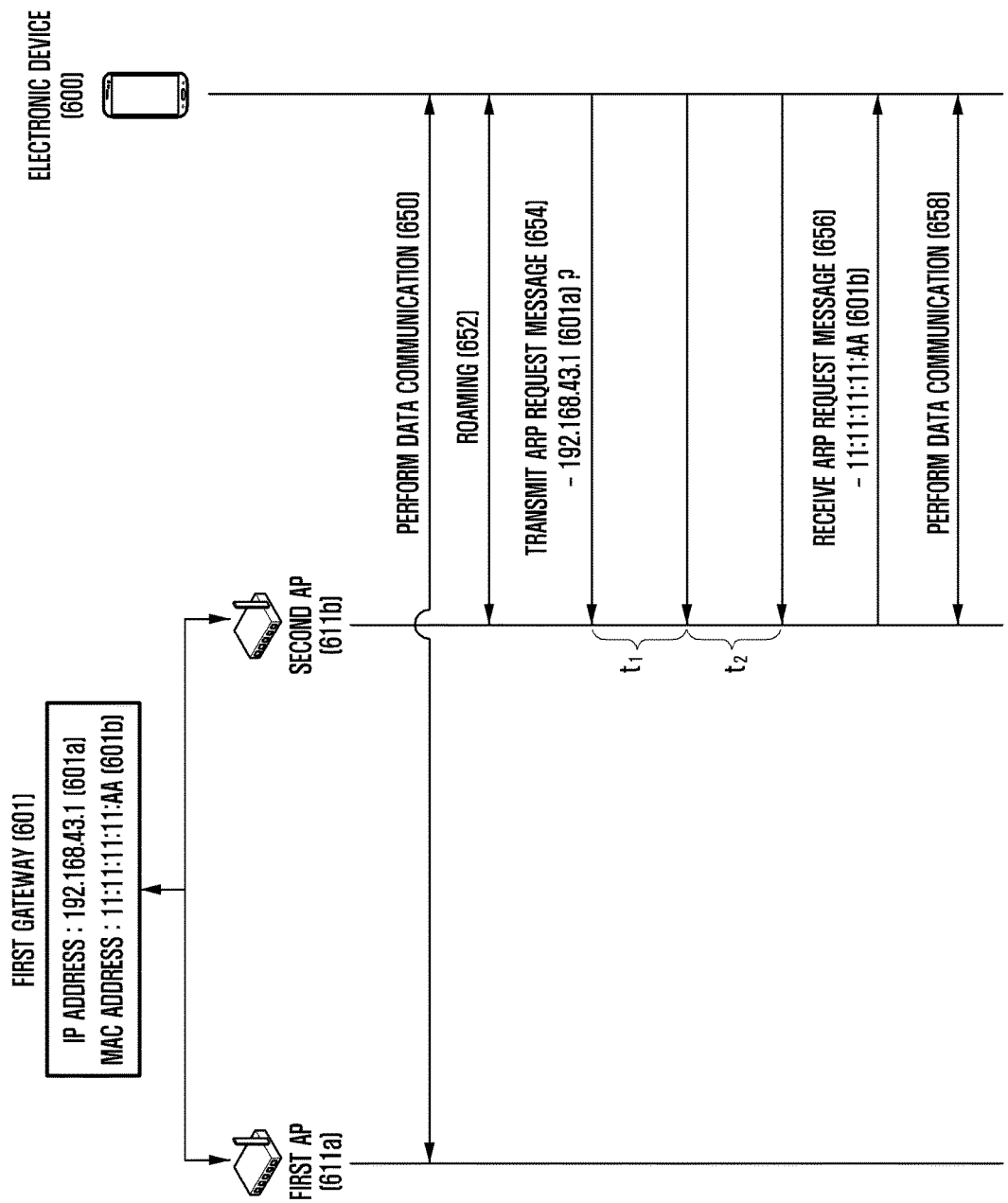
FIG. 6C is a diagram illustrating an operation of performing wireless data communication of an electronic device, according to an embodiment of the present invention.

FIG. 6C is a diagram illustrating an operation of performing wireless data communication of an electronic device when the predetermined gateway address information is valid, after a network of an electronic device is switched, according to an embodiment of the present invention.

According to an embodiment of the present invention, the electronic device 600 performs wireless data communication by being connected to a first network, in step 650. The first network corresponds to a first AP 611a connected to a first gateway and a second network corresponds to a second AP 611b connected to the first gateway.

The electronic device 600 switches from the first network to the second network while performing wireless data communication, in step 652. For example, the electronic device 600 may roam to the second AP 611b of the first gateway 601 while performing the wireless data communication through the first AP 611a of the first gateway 601.

The electronic device 600 broadcasts an address identification message to the second network in order to identify whether predetermined gateway address information 601a is valid in the second network, in step 654. The address identification message may include an ARP request message.

According to an embodiment of the present invention, the electronic device 600 transmits the address identification message to the second network at least once. For example, the electronic device 600 may transmit the ARP request message N times to the second network in order to identify whether the predetermined gateway address information 601a is valid in the second network. The number of times of transmission may be randomly configured by a user of the electronic device 600, may be automatically configured as an average of the configured numbers of times of the transmission in a network before the roaming, and may be configured by various methods.

According to an embodiment of the present invention, the electronic device 600 transmits, at least once, the address identification message at a predetermined time interval or a varying time interval until an address response message in response to the address identification message within the designated number of times or designated time is received. For example, the electronic device 600 may transmit the ARP request message N times for each 300 msec. The electronic device 600 may transmit the ARP request message N times at a time interval that increases by a predetermined rate such as 100 msec-200 msec-300 msec. The electronic device 600 may transmit the ARP request message N times at a time interval that decreases by a predetermined rate such as 300 msec-200 msec-100 msec. When the address identification message has been received, the first gateway 601 transmits an address response message in response to the received address identification message to the electronic device 600. For example, the first gateway 601 may receive an ARP request message including address information (192.168.43.1) 601a of the first gateway from the electronic device 600 through the second AP 611b. The first gateway 601 may identify whether the address information 601a included in the received ARP request message is identical to the address information 601a of the first gateway 601.

When the address information 601a is identical to the address information 601a of the first gateway 601, the electronic device 600 receives an ARP reply message, which includes MAC address information (11:11:11:11:11:AA) 601b of the first gateway 601, from the first gateway 601, in step 656.

When the address response message has been received within the designated number of times or designated time, the electronic device 600 may be used as it is without updating the predetermined gateway address information, in step 658. The electronic device 600 may continuously perform wireless data communication through the second network.

The electronic device 600 uses the predetermined gateway address information as it is without updating the predetermined gateway address information so that transmission/reception operations of an unnecessary message generated between the networks can be removed and accordingly, a traffic and burden applied to the network can decrease.

According to an embodiment of the present invention, at least some of the devices (for example, modules or functions thereof) or the method (for example, operations) may be implemented by a command stored in a computer-readable storage medium in a programming module form. When the command is executed by one or more processors (for example, the processor 310), the one or more processors may execute a function corresponding to the command. The computer-readable storage medium may be, for example, the memory 330. At least some of the programming modules may be implemented (for example, executed) by, for example, the processor 310. At least some of the programming modules may include, for example, a module, a program, a routine, a set of instructions or a process for performing one or more functions.

The computer readable recording medium may include magnetic media such as, for example, a hard disc, a floppy disc, and a magnetic tape, optical media such as a CD-ROM and a DVD, magneto-optical media such as a floptical disk, and hardware devices specifically configured to store and execute program commands, such as a ROM, a RAM, and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module, according to an embodiment the present invention, may include one or more of the aforementioned components or may further include other additional components, or some of the aforementioned components may be omitted. Operations executed by a module, a programming module, or other component elements, according to an embodiment of the present invention, may be executed sequentially, in parallel, repeatedly, or in a heuristic manner. Further, some operations may be executed according to another order or may be omitted, or other operations may be added.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for providing a network connection of an electronic device, the method comprising:
    receiving gateway address information of a first network from the first network;
    configuring the gateway address information as gateway address information of the electronic device;
    transmitting a plurality of address identification messages to a second network in response to determining that the electronic device has switched from the first network to the second network;
    determining whether the configured gateway address information remains valid based on whether an address response message corresponding to the plurality of address identification messages is received by the electronic device; and
    determining whether to update the configured gateway address information based on whether the configured gateway address information remains valid.

2. The network connection method of claim 1, wherein determining whether the configured gateway address information remains valid comprises determining whether gateway address information of the second network is identical to the gateway address information of the first network.

3. The network connection method of claim 1, wherein transmitting the plurality of address identification messages comprises transmitting the plurality of address identification messages at least once to the second network at a predetermined time interval or a varying time interval until the address response message corresponding to the plurality of address identification messages is received within a designated number of times or a designated time.

4. The network connection method of claim 3, wherein the plurality of address identification messages comprises an Address Resolution Protocol (ARP) request message and the address response message comprises an ARP reply message.

5. The network connection method of claim 1, wherein determining whether to update the configured gateway address information comprises maintaining the configured gateway address information when the address response message is received from the second network.

6. The network connection method of claim 1, wherein determining whether to update the configured gateway address information comprises:
    receiving the gateway address information of the second network from the second network when the address response message has not been received from the second network; and
    re-configuring the configured gateway address information as the gateway address information of the second network.

7. The network connection method of claim 6, further comprising:
    receiving an Internet Protocol (IP) address of the electronic device from the second network to re-configure the IP address when the address response message has not been received from the second network.

8. The network connection method of claim 6, further comprising:
    connecting to the second network using the re-configured gateway address information when the address response message has not been received from the second network.

9. The network connection method of claim 1, further comprising:
    connecting to the second network using the configured gateway address information when the address response message is received from the second network.

10. An electronic device comprising:
    a communication module that is connected to at least one of a first network and a second network; and
    a processor configured to:
    control the communication module to receive gateway address information of the first network from the first network,
    configure the gateway address information of the first network as gateway address information of the electronic device,
    control the communication module to transmit a plurality of address identification messages to the second network in response to determining that the electronic device has switched from the first network to the second network,
    determines whether the configured gateway address information remains valid based on whether an address response message corresponding to the plurality of address identification messages is received by the communication module, and
    determines whether to update the configured gateway address information based on whether the configured gateway address information remains valid.

11. The electronic device of claim 10, wherein the processor is further configured to determines whether the gateway address information of the second network is identical to the gateway address information of the first network.

12. The electronic device of claim 10, wherein the processor is further configured to transmit the plurality of address identification messages at least once to the second network at a predetermined time interval or a varying time interval until the address response message in response to the plurality of address identification messages is received within a designated number of times or a designated time.

13. The electronic device of claim 10, wherein the plurality of address identification messages comprises an Address Resolution Protocol (ARP) request message and the address response message comprises an ARP reply message.

14. The electronic device of claim 10, wherein the processor is further configured to maintain the configured gateway address information, when the address response message corresponding to the plurality of address identification messages has been received from the second network.

15. The electronic device of claim 10, wherein the processor is further configured to receive the gateway address information of the second network from the second network and re-configure the configured gateway address information to the gateway address information of the second network, when the address response message in response to the plurality of address identification messages has not been received from the second network.

16. The electronic device of claim 15, wherein the processor is further configured to connect to the second network using the re-configured gateway address information when the address response message has not been received from the second network.

17. The electronic device of claim 10, wherein the processor is further configured to connect to the second network using the predetermined gateway address information when the address response message in response to the plurality of address identification messages has been received from the second network.

18. A non-transitory computer readable recording medium, which records a program for executing operations, which comprise:
  receiving gateway address information of a first network from the first network;
  configuring the gateway address information as gateway address information of an electronic device;
  transmitting a plurality of address identification messages to a second network in response to determining that the electronic device has switched from the first network to the second network;
  determining whether the configured gateway address information remains valid based on whether an address response message corresponding to the plurality of address identification messages is received by the electronic device; and
  determining whether to update the configured gateway address information based on whether configured gateway address information remains valid.

* * * * *